US012280765B2

(12) United States Patent
Tatekawa et al.

(10) Patent No.: US 12,280,765 B2
(45) Date of Patent: Apr. 22, 2025

(54) CONTROL APPARATUS FOR ALL-WHEEL-DRIVE HYBRID ELECTRIC VEHICLE

(71) Applicant: SUBARU CORPORATION, Tokyo (JP)

(72) Inventors: Hiroshi Tatekawa, Tokyo (JP); Yuichi Tanaka, Tokyo (JP); Kazuki Fujisawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/007,573

(22) PCT Filed: Aug. 20, 2021

(86) PCT No.: PCT/JP2021/030552
§ 371 (c)(1),
(2) Date: Dec. 1, 2022

(87) PCT Pub. No.: WO2023/021686
PCT Pub. Date: Feb. 23, 2023

(65) Prior Publication Data
US 2024/0300472 A1   Sep. 12, 2024

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/06* (2013.01); *B60W 10/08* (2013.01); *B62D 15/021* (2013.01);
(Continued)

(58) Field of Classification Search
CPC .... B62D 15/021; B60K 6/445; B60K 17/165; B60K 6/44; B60K 6/48; F16D 41/00; B60L 7/10; B60W 30/18127
See application file for complete search history.

(56) References Cited

U.S. PATENT DOCUMENTS

2005/0103551 A1* 5/2005 Matsuno ......... B60W 30/18127
                                                     180/243
2013/0035831 A1    2/2013 Nozu et al.
(Continued)

FOREIGN PATENT DOCUMENTS

JP   2009-113570 A   5/2009
JP   2009-143292 A   7/2009
(Continued)

OTHER PUBLICATIONS

International Search Report in the corresponding International Application No. PCT/JP2021/030552 dated Nov. 9, 2021, with English Translation (4 pages).
(Continued)

*Primary Examiner* — Yuri Kan
(74) *Attorney, Agent, or Firm* — Rimon P.C.

(57) ABSTRACT

An HEV-CU determines whether a traveling state requires giving priority to a front and rear driving force control (e.g., whether a vehicle is cornering) on the basis of a traveling state of the vehicle. If the traveling state requires giving priority to the front and rear driving force control (e.g., the vehicle is cornering), the HEV-CU-preferentially controls of an engine and a motor generator as well as engagement force of a differential limiting clutch in accordance with friction force between front and rear wheels and a road surface. If the traveling state does not require giving priority to the front and rear driving force control (e.g., the vehicle is traveling straight), the HEV-CU preferentially controls the driving of the motor generator to cause a charged state (SOC) of a
(Continued)

high-voltage battery that supplies electric power to the motor generator to fall within a predetermined range.

18 Claims, 3 Drawing Sheets

(51) Int. Cl.
*B60W 10/08* (2006.01)
*B62D 15/02* (2006.01)

(52) U.S. Cl.
CPC ............... *B60W 2510/0208* (2013.01); *B60W 2510/202* (2013.01); *B60W 2510/205* (2013.01)

(56) References Cited

U.S. PATENT DOCUMENTS

| | | | |
|---|---|---|---|
| 2016/0031310 A1* | 2/2016 | Swales | B60K 6/48 903/905 |
| 2018/0162349 A1 | 6/2018 | Chang et al. | |
| 2019/0315243 A1* | 10/2019 | Kodera | B60L 7/10 |
| 2020/0062128 A1* | 2/2020 | Habata | B60K 6/44 |
| 2021/0101477 A1* | 4/2021 | Gaither | F16D 41/00 |
| 2021/0101480 A1* | 4/2021 | Gaither | B60K 17/165 |
| 2023/0011741 A1* | 1/2023 | Tatekawa | B60K 6/445 |

FOREIGN PATENT DOCUMENTS

| | | |
|---|---|---|
| JP | 2011-213275 A | 10/2011 |
| JP | 2013-032059 A | 2/2013 |
| JP | 2013-052693 A | 3/2013 |

OTHER PUBLICATIONS

Notice of Reasons for Refusal received in corresponding Japanese Patent Application No. 2023-542152, dated Jun. 25, 2024, w/ English Translation.

* cited by examiner

[ FIG. 1 ]
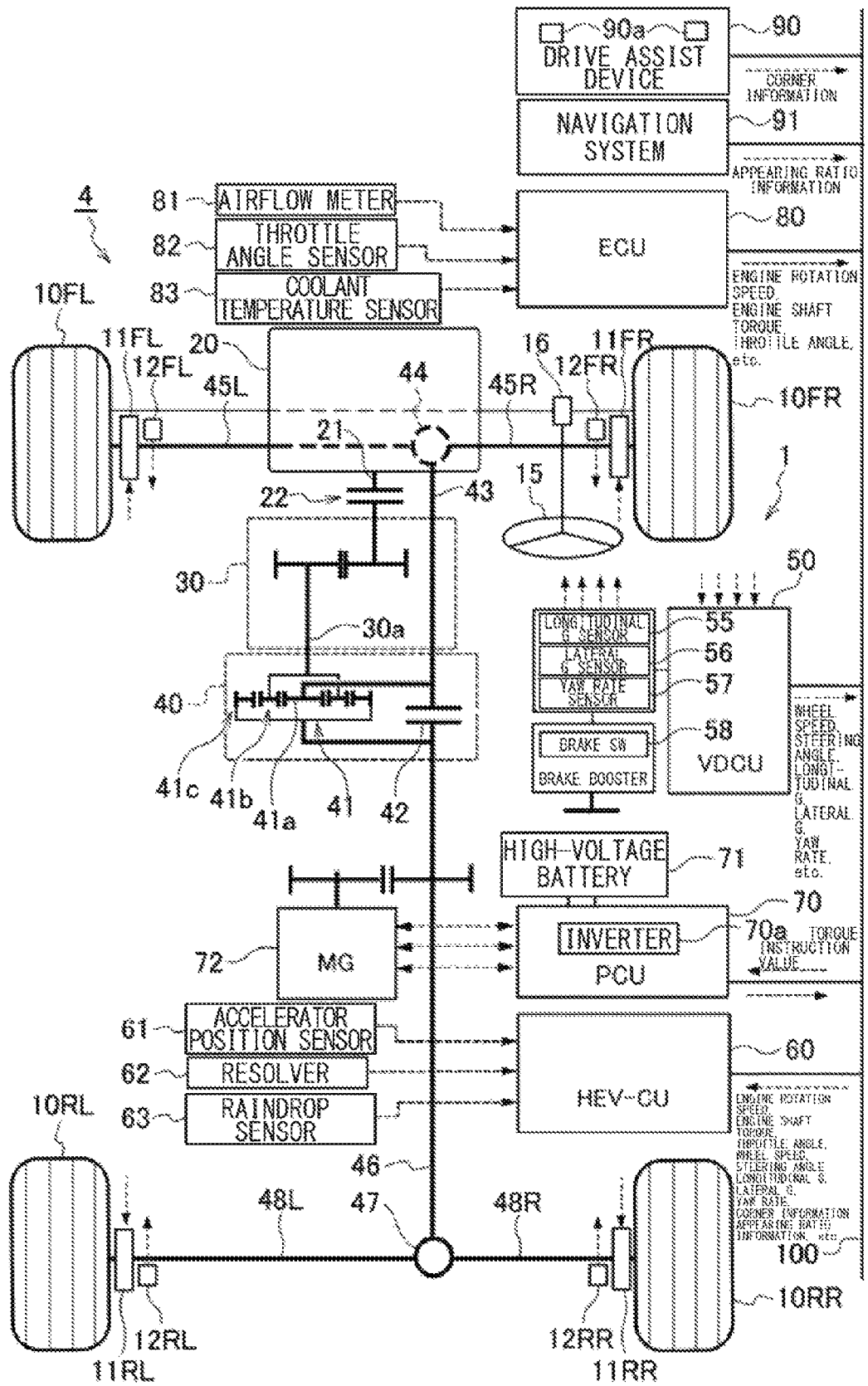

[ FIG. 2 ]
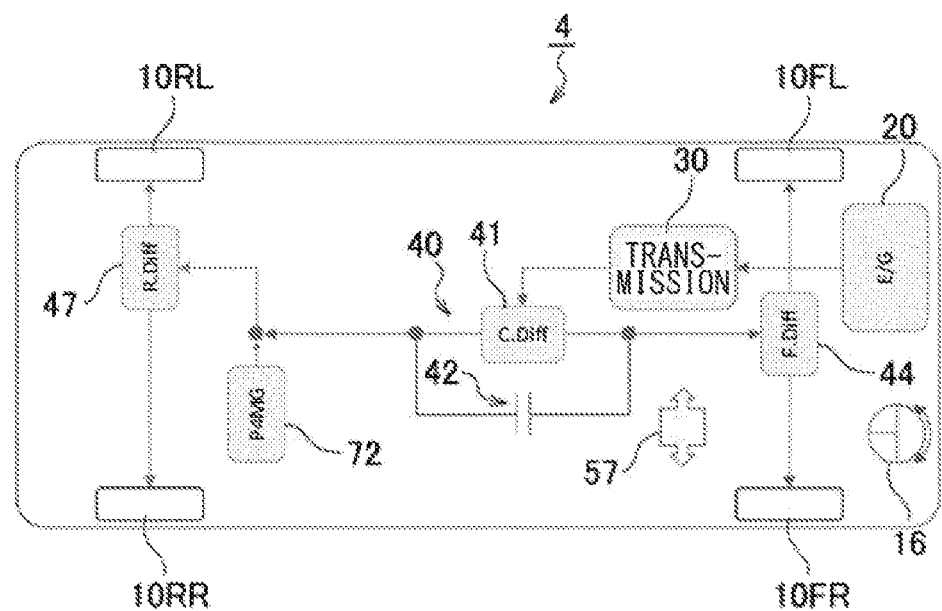

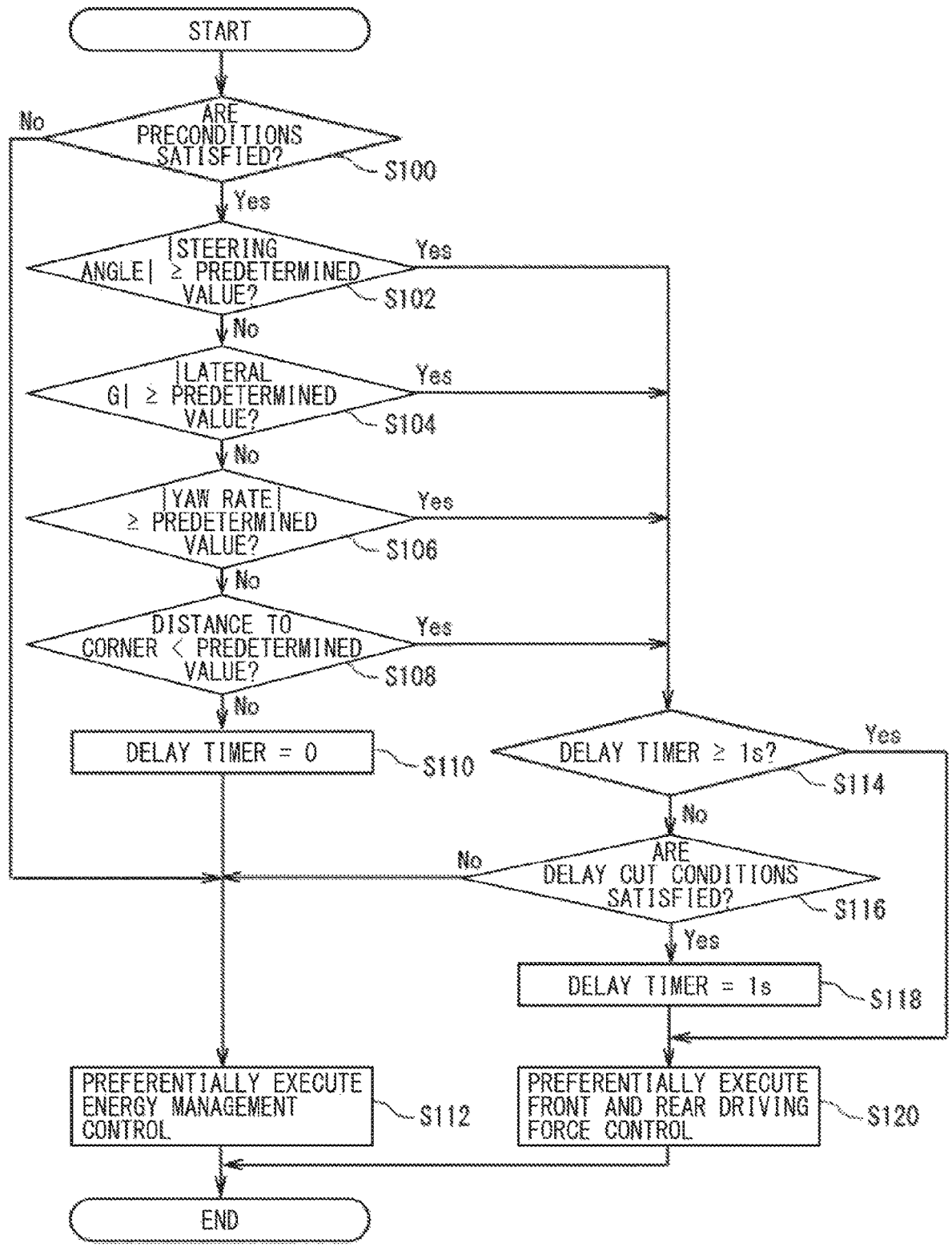

CONTROL APPARATUS FOR ALL-WHEEL-DRIVE HYBRID ELECTRIC VEHICLE

CROSS REFERENCE TO RELATED APPLICATIONS

This application is the U.S. National Phase under 35 US.C. § 371 of International Application No. PCT/JP2021/030552, filed on Aug. 20, 2021, the entire contents of each are hereby incorporated by reference.

TECHNICAL FIELD

The invention relates to a control apparatus for an all-wheel-drive hybrid electric vehicle.

BACKGROUND ART

Recently, there has been proposed an all-wheel-drive hybrid electric vehicle (AWD HEV) that includes a rear-axle drive motor and integrally controls a balance between an engine output and a motor output (power running/regeneration) to thereby continuously vary distribution of driving force between front wheels and rear wheels in accordance with friction force of front and rear tires (to thereby perform a front and rear driving force control), thus achieving high driving stability.

For example, Patent Literature 1 discloses a vehicle drive system (all-wheel-drive hybrid electric vehicle) in which a motor generator is provided to a propeller shaft of an unequal torque distribution AWD (all wheel drive) system giving more torque to a rear wheel side. In a case where a slip or a sign of a slip occurs on the rear wheel side upon acceleration, regeneration is performed. In a case where a vertical load of rear wheels is increased, for example, by a load transfer upon acceleration and there is room in driving force transmission capacity, drive assist is performed. Such a vehicle drive system is thus excellent in both traction performance and driving stability upon turning acceleration.

CITATION LIST

Patent Literature

Patent Literature 1: Japanese Unexamined Patent Application Publication No. 2009-Summary of Invention

Problem to be Solved by the Invention

In a vehicle drive system (all-wheel-drive hybrid electric vehicle) disclosed in Patent Literature 1, however, it may sometimes be difficult to perform drive assist when it is desired to perform the drive assist (a front and rear driving force control), for example, due to a driving (power running/regeneration) request for a motor generator to cause an engine to operate in an operation range with favorable combustion efficiency (specific fuel consumption) or due to a driving (power running/regeneration) request for the motor generator to appropriately control a charged state (SOC: State Of Charge) of a high-voltage battery that supplies electric power to the motor generator, i.e., due to a driving (power running/regeneration) request for the motor generator in terms of energy management. In other words, there may be a situation in which the front and rear driving force control is restricted by energy management (control).

The invention is made to solve the above-described issue, and it is an object of the invention to provide a control apparatus for an all-wheel-drive hybrid electric vehicle that makes it possible to preferentially execute a front and rear driving force control without being restricted by an energy management control in a situation where it is desired to give priority to the front and rear driving force control (i.e., to achieve a balance between the front and rear driving force control and the energy management control).

Means for Solving the Problem

A control apparatus for an all-wheel-drive hybrid electric vehicle according to the invention includes an engine, a center differential unit, a motor generator, a traveling-state detection unit, and a control unit. The center differential unit includes a differential limiting clutch, and is configured to distribute driving force supplied from the engine between a front wheel and a rear wheel and outputs the driving force thereto. The differential limiting clutch is configured to freely limit differential motion of the front wheel and differential motion of the rear wheel in accordance with engagement force. The motor generator is provided between the center differential unit and the rear wheel, and is coupled to the rear wheel to allow torque to be transmitted between the rear wheel and the motor generator. The traveling-state detection unit is configured to detect a traveling state of the all-wheel-drive hybrid electric vehicle. The control unit controls driving of the engine and driving of the motor generator as well as the engagement force of the differential limiting clutch. The control unit determines whether or not the traveling state requires giving priority to a front and rear driving force control on the basis of the traveling state of the vehicle detected by the traveling-state detection unit. In a case where the traveling state is determined to require giving priority to the front and rear driving force control, the control unit preferentially executes the front and rear driving force control of controlling the driving of the engine and the driving of the motor generator as well as the engagement force of the differential limiting clutch in accordance with friction force between the front and rear wheels and a road surface. In a case where the traveling state is determined not require giving priority to the front and rear driving force control, the control unit preferentially executes an energy management control of controlling the driving of the motor generator to cause a charged state of a high-voltage battery to fall within a predetermined range. The high-voltage battery configured supply electric power to the motor generator.

According to the control apparatus for an all-wheel-drive hybrid electric vehicle according to the invention, it is determined whether or not the traveling state requires giving priority to the front and rear driving force control (e.g., whether or not the vehicle is cornering) on the basis of the traveling state of the vehicle. In a case where the traveling state is determined as requiring giving priority to the front and rear driving force control (e.g., the vehicle is cornering), executed preferentially is the front and rear driving force control of controlling the driving of the engine and the motor generator as well as the engagement force of the differential limiting clutch in accordance with the friction force between the front and rear wheels and the road surface. In a case where the traveling state is determined as not requiring giving priority to the front and rear driving force control (e.g., the vehicle is traveling straight), executed preferentially is the energy management control of controlling the driving of the motor generator to cause the charged state (SOC) of the high-voltage battery to fall within the predetermined range. The high-voltage battery supplies electric power to the motor generator. Thus, by preferentially executing the energy management control when it is unnecessary to preferentially execute the front and rear driving force control, the charged state (SOC) of the high-voltage battery is maintained within an appropriate range. It is therefore possible to use the electric power in a situation that requires preferentially executing the front and rear driving force control. As a result, it is possible to achieve (appropriately adjust) a balance between the front and rear driving force control and the energy management control.

Effects of the Invention

As a result, according to the invention, it is possible to preferentially execute a front and rear driving force control without being restricted by an energy management control (i.e., to achieve a balance between the front and rear driving force control and the energy management control) in a situation where it is desired to give priority to the front and rear driving force control.

BRIEF DESCRIPTION OF DRAWINGS

FIG. 1 is a block diagram illustrating an overall configuration of a control apparatus for an all-wheel-drive hybrid electric vehicle according to one embodiment and an all-wheel-drive hybrid electric vehicle (AWD HEV) on which the control apparatus is mounted.

FIG. 2 is a diagram illustrating a flow of torque in the all-wheel-drive hybrid electric vehicle (AWD HEV) on which the control apparatus for an all-wheel-drive hybrid electric vehicle according to one embodiment is mounted.

FIG. 3 is a flowchart illustrating a process procedure of a process of switching (a process of adjustment) between a front and rear driving force control and an energy management control by the control apparatus for an all-wheel-drive hybrid electric vehicle according to one embodiment.

MODES FOR CARRYING OUT THE INVENTION

In the following, some preferred embodiments of the invention are described in detail with reference to the drawings. It is to be noted that in the drawings, the same or corresponding parts are denoted by the same reference numerals to avoid any redundant description.

First, referring to FIG. 1, a description is given of a configuration of a control apparatus for an all-wheel-drive hybrid electric vehicle according to an embodiment. FIG. 1 is a block diagram illustrating an overall configuration of a control apparatus 1 for an all-wheel-drive hybrid electric vehicle and an all-wheel-drive hybrid electric vehicle (AWD HEV) 4 on which the control apparatus 1 is mounted.

An engine 20 may be of any type. For example, the engine 20 is a horizontal-opposed direct-injection four-cylinder gasoline engine. In the engine 20, air taken in from an air cleaner (illustration omitted) is restricted by an electronically-controlled throttle valve (hereinafter, also simply referred to as a "throttle valve") provided at an intake pipe, and such air flows through an intake manifold to be taken into each of cylinders provided in the engine 20. Here, an amount of the air taken in from the air cleaner is detected by an airflow meter 81. In addition, the throttle valve is provided with a throttle angle sensor 82 that detects an opening angle of the throttle valve. An injector that injects a fuel is attached to each of the cylinders. In addition, an ignition plug and a coil with a built-in igniter are also attached to each of the cylinders. The ignition plug ignites an air-fuel mixture. The coil with the built-in igniter applies a high voltage to the ignition plug. In each of the cylinders of the engine 20, the air-fuel mixture including the intake air and the fuel injected by the injector is ignited by the ignition plug to combust. Exhaust gas after the combustion is discharged via an exhaust pipe.

In addition to the airflow meter 81 and the throttle angle sensor 82 described above, a cam angle sensor is attached to the vicinity of a camshaft of the engine 20. The cam angle sensor is adapted to determination of the cylinders of the engine 20. In addition, a crank angle sensor is attached to the vicinity of a crankshaft of the engine 20. The crank angle sensor detects a position of the crankshaft. These sensors are coupled to an engine control unit (hereinafter, referred to as an "ECU") 80 which will be described later. In addition, various sensors are coupled to the ECU 80. The various sensors include a coolant temperature sensor 83 that detects a temperature of a coolant of the engine 20.

For example, a manual transmission (MT) 30 is coupled to an output shaft (crankshaft) 21 of the engine 20 via a dry clutch 22. The manual transmission 30 converts and outputs the driving force from the engine 20. The manual transmission 30 is a transmission in which a shifting operation is performed manually. For example, a manual transmission having concentric input and output shafts is used. As the manual transmission 30, used may be a publicly-known manual transmission, i.e., a manual transmission in which a driving gear and a driven gear for each shift position are biaxially disposed; and a synchromesh mechanism and components, for example, a coupling sleeve, a shift fork, and a striking rod, are disposed adjacent to the gears. The components including the coupling sleeve, the shift fork, and the striking rod cause the synchromesh mechanism to operate and are coupled to a shift lever. It is to be noted that, in place of the manual transmission (MT), for example, a stepped automatic transmission (AT), a continuously variable transmission (CVT), a DCT (Dual Clutch Transmission), or any other type of transmission may be used.

A center differential unit 40 is coupled to an output shaft 30a of the manual transmission 30. Driving force converted by the manual transmission 30 is distributed by the center differential unit 40 and is outputted (transmitted) to each of a front drive shaft 43 and a propeller shaft 46. In the present embodiment, as the center differential unit 40, employed is a system in which: a center differential (41) including a planetary gear unit 41 that allows for unequal front and rear torque distribution is combined with a differential limiting mechanism including a multi-plate clutch (corresponding to a differential limiting clutch described in the claims and hereinafter also referred to as an "LSD clutch") 42; and engagement force (i.e., differential limiting intensity) of the LSD clutch 42 is electrically adjustable. It is to be noted that a cam mechanism is also incorporated in the center differential unit 40 in addition to the configuration described above. The cam mechanism generates clutch crimping force by torque difference in order to generate differential limiting force at a moment when road surface reaction force involves a difference. The center differential unit 40 basically distributes torque between the front wheels and the rear wheels, for example, at 41:59. The center differential unit 40 secures stability while exerting great driving force by front and rear torque distribution performed by the LSD clutch 42 on the basis of a traveling situation.

More specifically, the planetary gear unit (center differential) 41 includes a sun gear 41*a*, a planetary pinion (planetary carrier) 41*b*, and a ring gear (internal gear) 41*c*. The output shaft 30*a* of the manual transmission 30 is coupled to the planetary pinion (planetary carrier) 41*b*, and driving force transmitted from the engine 20 is inputted to the planetary pinion (planetary carrier) 41*b*. The front drive shaft 43 is coupled to the sun gear 41*a*, and driving force is thus transmitted (outputted) to the front wheel side. The propeller shaft 46 is coupled to the ring gear (internal gear) 41*c*, and driving force is thus transmitted (outputted) to the rear wheel side. It is to be noted that a coupling relationship between the components of the planetary gear unit 41 and the output shaft 30*a*, the front drive shaft 43, and the propeller shaft 46 is not limited to that in the present embodiment, and these components may be associated with each other in any way.

In addition, the LSD clutch (differential limiting clutch) 42 that performs differential limiting is incorporated in the center differential unit 40, between the ring gear 41*c* in charge of rear-wheel output and the sun gear 41*a* in charge of front-wheel output. The LSD clutch (differential limiting clutch) 42 has a configuration in which crimping force (engagement force) is applied to the LSD clutch 42 from each of an electromagnetic solenoid (electromagnet) and a torque cam (illustration omitted) that are disposed to be opposed to each other with the LSD clutch 42 interposed therebetween.

The LSD clutch 42 varies distribution of torque to the front and rear wheels and exercises a differential limiting function in accordance with the applied engagement force. As the LSD clutch 42, for example, an electromagnetic clutch that is able to electrically adjust the engagement force (engagement and disengagement) is favorably used. It is to be noted that the engagement force (differential limiting) of the LSD clutch 42 is controlled by a hybrid control unit (hereinafter, referred to as an "HEV-CU") 60.

As described above, the input (driving force) from the manual transmission 30 is transmitted to the planetary gear unit 41, is outputted from the sun gear 41*a* to front wheels 10FL and 10FR, and is also outputted from the ring gear 41*c* on the outer periphery to rear wheels 10RL and 10RR. More specifically, the input (driving force) from the manual transmission 30 is transmitted to the planetary pinion (planetary carrier) 41*b* and is transmitted from the sun gear 41*a* to the front differential (hereinafter, also referred to as a "front diff") 44 via the front drive shaft 43. The front diff 44 is, for example, a differential of a bevel gear type. Driving force from the front diff 44 is transmitted to the left front wheel 10FL via a left-front-wheel drive shaft 45L, and is transmitted to the right front wheel 10FR via a right-front-wheel drive shaft 45R.

Meanwhile, the input (driving force) transmitted to the planetary gear unit 41 is transmitted from the ring gear 41*c* on the outer periphery to the rear differential (hereinafter, also referred to as a "rear diff") 47 via the propeller shaft 46. A left-rear-wheel drive shaft 48L and a right-rear-wheel drive shaft 48R are coupled to the rear diff 47. Driving force from the rear diff 47 is transmitted to the left rear wheel 10RL via the left-rear-wheel drive shaft 48L, and is transmitted to the right rear wheel 10RR via the right-rear-wheel drive shaft 48R.

In addition, a motor generator (MG) 72 is coupled to the propeller shaft 46 in a manner that allows for torque transmission. More specifically, the motor generator 72 is coupled to the propeller shaft 46, for example, via a motor reduction gear.

The motor generator 72 is configured as a synchronous motor generator having both a function as a motor that converts supplied electric power into mechanical power and a function as a generator that converts supplied mechanical power into electric power. That is, the motor generator 72 operates as a motor that generates driving torque upon driving a vehicle, and operates as a generator upon regeneration.

Brakes 11FR to 11RR (hereinafter, all of the brakes 11FR to 11RR are sometimes collectively referred to as brakes 11) are attached to the wheels 10FR to 10RR (hereinafter, all of the wheels 10FR to TORR are sometimes collectively referred to as wheels 10), respectively. The brakes 11FR to 11RR perform braking of the wheels 10FR to 10RR, respectively. In addition, wheel speed sensors 12FR to 12RR (hereinafter, all of the wheel speed sensors 12FR to 12RR are sometimes collectively referred to as wheel speed sensors 12) are attached to the wheels 10FR to 10RR, respectively. The wheel speed sensors 12FR to 12RR each detect a wheel rotation speed.

In the present embodiment, a disc brake is employed as the brake 11. The brake 11 includes a brake disc attached to the wheel 10 of the AWD HEV 4 and a brake caliper including a brake pad and a wheel cylinder built therein. Upon braking (upon braking), the brake pad is pressed against the brake disc by hydraulic pressure, and the friction force causes braking of the wheel 10 coupled to the brake disc. It is to be noted that although the brake 11 used in the present embodiment is a disc brake, a drum brake that allows for braking by pressing a friction material against an inner peripheral surface of a drum or any other brake may be used.

The wheel speed sensor 12 is a non-contact sensor that detects a change in magnetic field by a rotor (a gear rotor or a magnetic rotor) rotating together with the wheel 10. For example, a semiconductor sensor that detects rotor rotation by a hall element or an MR element is favorably used.

Because of such a configuration, as illustrated in FIG. 2, in the all-wheel-drive hybrid electric vehicle (AWD HEV) 4 according to the present embodiment, an output of the engine 20 is transmitted to the front drive shaft 43 and the propeller shaft 46 (front and rear wheel shafts) via the center differential unit 40 provided with the LSD clutch 42. An output (power running/regeneration) of the motor generator 72 is transmitted to the propeller shaft 46 (the rear wheel shaft). Further, the balance between the engine output and the motor generator output is integrally controlled. Thus, variable distribution of the driving force to the front and rear wheels 10 is performed as desired, and assist/regeneration is performed by the motor generator 72 for improvement in fuel economy. It is to be noted that FIG. 2 is a diagram illustrating a flow of torque in the all-wheel-drive hybrid electric vehicle (AWD HEV) 4.

Driving of the engine 20 and the motor generator 72 is comprehensively controlled by the HEV-CU 60. In addition, the engagement force (differential limiting) of the LSD clutch 42 is also controlled by the HEV-CU 60. That is, the HEV-CU 60 serves as a control unit described in the claims.

Here, the HEV-CU 60 is coupled to, for example, each of the ECU 80, a PCU 70, a vehicle dynamics control unit (hereinafter, referred to as a "VDCU") 50, a drive assist device 90, and a car navigation system 91 via a CAN (Controller Area Network) 100 in a mutually communicable manner. The ECU 80 comprehensively controls the engine 20. The VDCU 50 suppresses, for example, a skid of the vehicle to thereby improve traveling stability.

Each of the HEV-CU 60, the ECU 80, the VDCU 50, the drive assist device 90, and the car navigation system 91 includes, for example, a microprocessor, an EEPROM, a RAM, a back-up RAM, and an input and output I/F. The microprocessor performs calculation. The EEPROM holds therein, for example, a program to cause the microprocessor to execute each process. The RAM holds therein various pieces of data, including calculation results. The back-up RAM holds the stored contents with use of, for example, a battery.

The ECU 80 determines the cylinder on the basis of an output of the cam angle sensor, and determines an engine rotation speed on the basis of a change in rotation position of the crankshaft detected from an output of the crank angle sensor. In addition, the ECU 80 acquires various pieces of information including, for example, an intake air amount, a throttle angle, an air-fuel ratio of the air-fuel mixture, and a water temperature on the basis of detection signals supplied from the various sensors described above.

In addition, the ECU 80 also receives information including, for example, a requested output, the number of rotations (rotation speed) of the motor generator 72, and a depressed amount of an accelerator pedal (accelerator position) from the HEV-CU 60 via the CAN 100. Further, the ECU 80 controls a fuel injection amount, an ignition timing, and various devices including the throttle valve on the basis of the requested output from the HEV-CU 60 and various pieces of the acquired information, to thereby control the engine 20.

It is to be noted that the ECU 80 transmits various pieces of information including, for example, the engine rotation speed, the throttle angle, the engine shaft torque, and the water temperature of the engine (the temperature of the coolant) to a unit such as the HEV-CU 60 via the CAN 100.

The PCU 70 includes an inverter 70$a$ that converts DC electric power of the high-voltage battery 71 into three-phase electric power and supplies it to the motor generator 72. The PCU 70 drives the motor generator 72 via the inverter 70$a$ on the basis of a torque command value received from the HEV-CU 60. In contrast, upon regeneration, the inverter 70$a$ converts an AC voltage generated by the motor generator 72 into a DC voltage to charge the high-voltage battery 71.

Coupled to the VDCU 50 are, for example, the four wheel speed sensors 12FL to 12RR, a steering angle sensor 16, a longitudinal acceleration (longitudinal G) sensor 55, a lateral acceleration (lateral G) sensor 56, a yaw rate sensor 57, and a brake switch 58. As described above, the wheel speed sensors 12FL to 12RR detect rotation states of the wheels 10FL to 10RR by detecting rotation of gears attached to the centers of the wheels 10FL to 10RR, respectively, by magnetic pickup, for example. The longitudinal acceleration sensor 55 detects acceleration in a longitudinal direction acting on the AWD HEV 4 (hereinafter, also simply referred to as "acceleration"). The lateral acceleration sensor 56 detects acceleration in a lateral direction acting on the AWD HEV 4. In addition, the steering angle sensor 16 detects a turning angle of the front wheels 10FL and 10FR that are the steered wheels (i.e . . . a steering angle of the steering wheel 15) by detecting a rotation angle of a pinion shaft. The yaw rate sensor 57 detects a yaw rate of the AWD HEV 4.

The VDCU 50 causes braking of the vehicle by driving a brake actuator in accordance with an operation amount (a depressed amount) of the brake pedal. The VDCU 50 also detects the vehicle behavior by various sensors (e.g., the wheel speed sensor 12, the steering angle sensor 16, the longitudinal acceleration sensor 55, the lateral acceleration sensor 56, and the yaw rate sensor 57) and performs a brake control by automatic pressure application and a torque control of the engine 20 to suppress a skid and to thereby secure vehicle stability during turning. That is, the VDCU 50 prevents a skid and thereby secures excellent traveling stability, for example, when the vehicle enters a corner at an excessively high speed, or when the vehicle attitude (behavior) is disturbed by an abrupt steering-wheel operation. More specifically, the VDCU 50 detects, for example, the vehicle attitude (behavior) by the above-described sensors or any other method, and in a case where the vehicle is determined as oversteering, the VDCU 50 performs braking of the front wheel 10FL or 10FR on the outer side of the corner. In contrast, in a case where the vehicle is determined as understeering, the VDCU 50 automatically performs a control in accordance with a driving situation. For example, the VDCU 50 automatically performs a control to decrease engine power and to perform braking of the rear wheel 10RL or 10RR on the inner side of the corner. It is to be noted that the VDCU 50 also has, for example, an ABS (anti-lock brake) function and a TCS (traction control) function in addition to the above-described VDC (skid prevention) function.

The VDCU 50 transmits the wheel speed of each of the wheels 10, the steering angle, the longitudinal acceleration, the lateral acceleration, the yaw rate, the braking information (braking information), and any other information that are detected to the HEV-CU 60 via the CAN 100.

The drive assist device 90 has, for example, a function of detecting an external environment of the vehicle (e.g., a traveling environment in front of the vehicle) to give warning about an obstacle in front of the vehicle or a function of automatically performing braking (automatic braking) (automatic braking function/pre-crash braking function). In addition, the drive assist device 90 also has, for example, a function of assisting a driving operation of a driver by performing a control such as a following control or a warning control for the detected preceding vehicle.

The drive assist device 90 processes image data obtained by a stereo camera 90$a$ that acquires an image of a front region of the vehicle, for example, to thereby detect a situation of a traveling road or a traveling environment outside the vehicle (external environment) such as a preceding vehicle or an obstacle. The stereo camera 90$a$ includes, for example, a pair of cameras. In other words, the drive assist device 90 serves as an external environment detection unit described in the claims.

The drive assist device 90 performs image processing on the image data and detects a lane (traveling lane) on the basis of, for example, a lane line (white line) drawn on a road on which the vehicle travels. Further, the drive assist device 90 detects, for example, presence or absence of a corner (curve), a distance to the corner, a radius of the corner (turning radius), or a width of the road on the basis of the detected lane. In addition, the drive assist device 90 extracts a preceding vehicle from the captured image by a method such as edge extraction or a pattern recognition process, and determines an inter-vehicle distance between the vehicle and the preceding vehicle by a triangulation method on the basis of a difference in the position of the preceding vehicle between the acquired right and left images. The drive assist device 90 also determines a relative speed (whether or not the preceding vehicle has decelerated) on the basis of an amount of change from the distance determined for the previous frame.

In addition, the drive assist device 90 detects a road surface gradient of the traveling road. Further, the drive assist device 90 recognizes, for example, whether the road surface is wet, has accumulated snow, is frozen, etc. (i.e., detects a friction coefficient of the road surface of the traveling road), for example, on the basis of information regarding reflectance of the road surface. Further, the drive assist device 90 transmits the external environmental information including the detected pieces of corner information to the HEV-CU 60 via the CAN 100.

The car navigation system 91 detects an own vehicle position on the basis of GPS satellite signals received by a GPS (Global Positioning System). In addition, the car navigation system 91 calculates a mileage on the basis of vehicle speed information, and detects a vehicle traveling direction in accordance with a signal from a gyro sensor. In addition, the car navigation system 91 acquires road information (i.e., for example, external environment information including the presence or absence of a corner (curve), the distance to the corner, the radius of the corner, the width of the road, a crossing, a crosswalk, a pause sign, and the gradient of the road surface) of a road (traveling road) on which the own vehicle is traveling, from a map information storage device such as a built-in hard disk or a DVD disc. Further, the car navigation system 91 acquires information regarding a route to a destination, and also acquires information regarding a ratio between corners and straight roads to appear on the route to the destination. Further, the car navigation system 91 transmits information including, without limitation, the acquired own vehicle position information, the acquired road information (e.g., the external environment information including the presence or absence of the curve, the distance to the curve, the radius of the curve, and the gradient of the road surface), and the information regarding the ratio between the corners and the straight roads to appear on the route to the destination to the HEV-CU 60 via the CAN 100.

Coupled to the HEV-CU 60 are, for example, various sensors including an accelerator position sensor 61, a resolver 62, and a raindrop sensor (rain sensor) 63 (or a sensor that detects a differential motion of wipers). The accelerator position sensor 61 detects the depressed amount of the accelerator pedal (the operation amount of the accelerator). The resolver 62 detects the number of rotations (rotation speed) of the motor generator 72. The raindrop sensor 63 detects, for example, rainfall and snowfall.

The HEV-CU 60 receives information such as the engine rotation speed, the throttle angle, the engine shaft torque (output torque), or an engine water temperature (the temperature of the coolant) from the ECU 80 via the CAN 100. Further, the HEV-CU 60 receives information including, without limitation, the wheel speed of each of the wheels 10, the steering angle, the longitudinal acceleration, the lateral acceleration, the yaw rate, and the braking information (breaking information) from the VDCU 50 via the CAN 100. Further, the HEV-CU 60 receives various pieces of external environment information including the corner information from the drive assist device 90 via the CAN 100, and receives information including, without limitation, the information regarding the route to the destination and the information regarding the ratio between the corners and the straight roads to appear on the route from the car navigation system 91 via the CAN 100.

The HEV-CU 60 controls driving of the engine 20 and the motor generator 72 as well as the engagement force of the LSD clutch 42 of the center differential unit 40 on the basis of the information acquired, for example, from the various sensors described above and the various pieces of information obtained via the CAN 100.

In particular, the HEV-CU 60 has a function of preferentially executing the front and rear driving force control without being restricted by the energy management control in a situation where it is desired to give priority to the front and rear driving force control (i.e., a function of achieving a balance between the front and rear driving force control and the energy management control). In the HEV-CU 60, the program stored, for example, in the EEPROM is executed by the microprocessor to achieve the above-described function.

It is to be noted that, here, in the front and rear driving force control (AWD control), for example, the driving of the engine 20 and the motor generator 72 as well as the engagement force of the LSD clutch 42 (the front and rear distribution ratio) are controlled, for example, in accordance with the friction force between the front and rear wheels 10 and the road surface (slip). For example, examples of such a front and rear driving force control include: upon slow acceleration (e.g., upon acceleration on a low-u road), to cause the motor generator 72 to perform regeneration and thereby perform driving force distribution giving more driving force to the front wheels based on the front and rear load distribution (for example, driving force distribution at a ratio between the front wheels and the rear wheels of 60:40); upon sudden acceleration (e.g., upon acceleration on a high-u road), to drive the motor generator 72 (to cause the motor generator 72 to perform power running) and thereby perform driving force distribution giving more driving force to the rear wheels based on the front and rear load distribution (for example, driving force distribution at a ratio between the front wheels and the rear wheels of 40:60); and upon (high-G) cornering, to perform driving force distribution giving more driving force to the rear wheels (for example, driving force distribution at a ratio between the front wheels and the rear wheels of 40:60) and thereby reduce the load on the front wheels 10FL and 10FR (improve a turning performance).

In the energy management control, for example, the driving of the motor generator 72 is so controlled that the charged state (SOC) of the high-voltage battery 71 that supplies electric power to the motor generator 72 falls within a predetermined range. For example, examples of such an energy management control include: when the SOC of the high-voltage battery 71 decreases (e.g., upon continuous hill climbing or upon continuous high-load driving), to cause the motor generator 72 to generate electric power (perform regeneration) and thereby charge the high-voltage battery 71; for the purpose of avoiding a low-load operation range in which the combustion efficiency (specific fuel consumption) of the engine 20 is not favorable, to cause the motor generator 72 to generate electric power (perform regeneration) and thereby use an operation range in which the combustion efficiency (specific fuel consumption) of the engine 20 is favorable; when the SOC of the high-voltage battery 71 is high (e.g., upon continuous traveling on a downhill), to perform drive assist by the motor generator 72 and thereby consume electric power of the high-voltage battery 71; and for the purpose of avoiding a high-load operation range in which the combustion efficiency (specific fuel consumption) of the engine 20 is not favorable, to perform the drive assist by the motor generator 72 and thereby use the operation range in which the combustion efficiency (specific fuel consumption) of the engine 20 is favorable.

The HEV-CU 60 determines whether or not the traveling state requires giving priority to the front and rear driving force control on the basis of the traveling state of the AWD HEV 4. Further, if the traveling state is determined as requiring giving priority to the front and rear driving force control, the HEV-CU 60 preferentially executes the front and rear driving force control of controlling the driving of the engine 20 and the motor generator 72 as well as the engagement force (the front and rear distribution ratio) of the LSD clutch 42, for example, in accordance with the friction force between the front and rear wheels 10 and the road surface (slip). In contrast, if the traveling state is determined as not requiring giving priority to the front and rear driving force control, the HEV-CU 60 preferentially executes the energy management control of so controlling the driving of the motor generator 72 that the charged state (SOC) of the high-voltage battery 71 that supplies electric power to the motor generator 72 falls within the predetermined range.

On this occasion, the HEV-CU 60 determines that the traveling state requires giving priority to the front and rear driving force control in a case where the AWD HEV 4 is turning a corner (is cornering). The HEV-CU 60 determines that the traveling state does not require giving priority to the front and rear driving force control (i.e., allows to give priority to the energy management control) in a case where the AWD HEV 4 is traveling on a straight road (is traveling straight).

More specifically, the HEV-CU 60 determines whether or not the AWD HEV 4 is turning a corner (whether or not the AWD HEV 4 is turning), for example, on the basis of the steering angle, the lateral acceleration, and/or the yaw rate.

Further, it is preferable that the HEV-CU 60 preferentially executes the front and rear driving force control upon an elapse of a predetermined time (e.g., about 1 second) after the AWD HEV 4 starts turning the corner (after the AWD HEV 4 enters the corner). It is to be noted that, here, a reason why the front and rear driving force control is to be started after the elapse of the predetermined time is that it is preferable to secure execution of the front and rear driving force control after the AWD HEV 4 enters the corner, especially, when the AWD HEV 4 accelerates upon exiting the corner (at a timing when the accelerator pedal is depressed).

The HEV-CU 60 starts, however, the front and rear driving force control without waiting for the above-described predetermined time to elapse, for example: in a case where the change speed of the steering angle is a predetermined speed or higher; in a case where the radius of the corner (turning radius) is a predetermined value or less; and/or in a case where, for example, rainfall or snowfall is detected (i.e., in a case where friction resistance of the road surface is estimated to be a predetermined value or less). A reason for this is that it is preferable to swiftly start executing the front and rear driving force control in the above-described cases.

In addition, the HEV-CU 60 predicts entering of the vehicle into the corner on the basis of the distance to the corner and the vehicle speed. Further, in order to avoid sudden change in the front and rear driving force distribution during cornering, the HEV-CU 60 determines whether or not the front and rear driving force control is preferentially executable while the vehicle is turning the corner (while the vehicle is turning), for example, on the basis of the radius of the corner (turning radius).

Upon executing the energy management control, the HEV-CU 60 so controls the engagement force of the LSD clutch 42 that the driving force distribution ratio between the front and rear wheels 10 falls within a predetermined range (i.e., that the driving force is not distributed either too much to the front wheels 10FL and 10FR or too much to the rear wheels 10RL and 10RR) (i.e., the HEV-CU 60 causes torque to be transmitted from the driving wheel side with greater distributed driving force to the driving wheel side with less distributed driving force).

On this occasion, the HEV-CU 60 controls (adjusts) the engagement force of the LSD clutch 42 on the basis of the following Expression (1). That is, the following Expression (1) gives differential limiting power $P_{LSD}$ (=differential limiting torque×number of rotations) to achieve a target rear-wheel output distribution ratio-$D_{ER}$ that is set on the basis of a balance between a transmission output $P_{TM}$ and a motor generator output $P_{MG}$;

$$P_{LSD} = (2D_{ER} - D_{ER} \times D_{DR} - 1)P_{TM} - (1 - D_{ER}) \times P_{MG} \quad (1)$$

where:

$P_{LSD}$ is differential limiting power (in which transmission from the front to the rear is represented by a positive value);
$P_{TM}$ is a transmission output;
$P_{MG}$ is a motor generator (MG) output;
$D_{DR}$ is a center-differential rear-wheel output distribution ratio; and
$D_{ER}$ is a target rear-wheel output distribution ratio.

Further, upon executing the energy management control, the HEV-CU 60 so controls the driving (power running/regeneration) of the motor generator 72 that the engine 20 is operable in a predetermined operation range in which the combustion efficiency (fuel economy) is higher than a predetermined value.

Further, the HEV-CU 60 so executes the energy management control (charging) on a straight road (in a straight section) that the charged state (SOC) of the high-voltage battery 71 falls within a predetermined range (that the charged state of the high-voltage battery 71 is not either too much on the discharged side or too much on the charged side) on the basis of the ratio between the corners and the straight roads to appear on the route to the destination received from the car navigation system 91 and the charged state (SOC) of the high-voltage battery 71. That is, the HEV-CU 60 predicts the appearing of the corner on the examined route to the destination, and so controls a balance between charging and discharging of the high-voltage battery 71 that a power receiving state (SOC) of the high-voltage battery 71 is maintained to allow for preferential execution of the front and rear driving force control during cornering. That is, on the straight road, the HEV-CU 60 so performs a control that the high-voltage battery 71 is charged to store therein electric power required for performing the front and rear driving force control during cornering.

Next, referring to FIG. 3, an operation of the control apparatus 1 for an all-wheel-drive hybrid electric vehicle is described. FIG. 3 is a flowchart describing a process procedure of a process of switching (a process of adjusting a balance) between the front and rear driving force control and the energy management control to be performed by the control apparatus 1 for an all-wheel-drive hybrid electric vehicle. This process is executed by the HEV-CU 60 repeatedly at predetermined timings.

In step S100, it is determined whether or not a precondition for executing the front and rear driving force control is satisfied. More specifically, for example, it is determined whether or not the following three conditions (preconditions) are satisfied: whether or not the system is operating normally; whether or not the SOC of the high-voltage battery 71 falls within the predetermined range; and whether or not the vehicle speed is a predetermined value or higher.

Here, if the preconditions for executing the front and rear driving force control are not satisfied (if any one or more of the preconditions are not satisfied), the process proceeds to step S112, in which the energy management control is executed. Thereafter, the process is once ended. In contrast, if all the (three) preconditions are satisfied, the process proceeds to step S102.

In step S102, it is determined whether or not an absolute value of the steering angle is a predetermined value or greater. Here, if the absolute value of the steering angle is the predetermined value or greater, the process proceeds to step S114. In contrast, if the absolute value of the steering angle is less than the predetermined value, the process proceeds to step S104. It is to be noted that hysteresis for preventing hunting is provided for a threshold (predetermined value) of the steering angle, a threshold (predetermined value) of the lateral acceleration to be described later, and a threshold (predetermined value) of the yaw rate to be described later.

In step S104, it is determined whether or not an absolute value of the lateral acceleration is a predetermined value or greater. Here, if the absolute value of the lateral acceleration is the predetermined value or greater, the process proceeds to step S114. In contrast, if the absolute value of the lateral acceleration is less than the predetermined value, the process proceeds to step S106.

In step S106, it is determined whether or not an absolute value of the yaw rate is a predetermined value or greater. Here, if the absolute value of the yaw rate is the predetermined value or greater, the process proceeds to step S114. In contrast, if the absolute value of the yaw rate is less than the predetermined value, the process proceeds to step S108.

In step S108, it is determined whether or not the distance to (the entrance of) the corner is less than a predetermined value. Here, if the distance to (the entrance of) the corner is less than the predetermined value, the process proceeds to step S114. In contrast, if the distance to (the entrance of) the corner is the predetermined value or greater, the process proceeds to step S110.

In step S110, a delay timer that counts an elapsed time from a timing when the AWD HEV 4 starts to turn the corner (an elapsed time after the AWD HEV 4 enters the corner) is set to zero. Thereafter, the process proceeds to step S112.

In step S112, the energy management control is preferentially executed. It is to be noted that the energy management control is not described in detail here as it has been described above. Thereafter, this process is once ended.

In a case where an affirmative result is obtained in any of steps S102, S104, S106, and S108, i.e., in a case where it is determined that the vehicle is cornering or in a case where it is estimated that the vehicle is to enter the corner, in step S114, a value of the delay timer is incremented (+1), and it is determined whether or not the value of the delay timer has reached 1 second or greater, that is, it is determined whether or not 1 second has elapsed since the AWD HEV 4 has started turning the corner (after the AWD HEV 4 has entered the corner). Here, if the value of the delay timer is 1 second or greater, the process proceeds to step S120. In contrast, if the value of the delay timer is less than 1 second, the process proceeds to step S116.

In S116, it is determined whether or not a delay cut condition is satisfied. More specifically, for example, it is determined whether or not the following three conditions are satisfied: whether or not the change speed of the steering angle is a predetermined value or greater; whether or not the turning radius of the corner is a predetermined value or less; and whether or not rainfall or snowfall is detected (i.e . . . whether or not the friction resistance of the traveling road surface is estimated to be a predetermined value or less). Here, if none of the delay cut conditions is satisfied, the process proceeds to step S112, in which the energy management control is preferentially executed. Thereafter, this process is once ended. In contrast, if the delay cut conditions are satisfied (if any one or more of the delay cut conditions are satisfied), the process proceeds to step S118.

In step S118, the delay timer is set to 1 second (or to a value of 1 second or greater). Further, in step S120, the front and rear driving force control is preferentially executed. It is to be noted that the front and rear driving force control is not described in detail here as it has been described above. Thereafter, this process is once ended.

As described above in detail, according to the embodiment, it is determined whether or not the traveling state requires giving priority to the front and rear driving force control on the basis of the traveling state of the AWD HEV 4. Further, in a case where the traveling state is determined as requiring giving priority to the front and rear driving force control (e.g., the vehicle is cornering), executed preferentially is the front and rear driving force control of controlling the driving of the engine 20 and the motor generator 72 as well as the engagement force of the LSD clutch 42 (the front and rear distribution ratio), for example, in accordance with the friction force between the front and rear wheels 10 and the road surface. In contrast, in a case where the traveling state is determined as not requiring giving priority to the front and rear driving force control (e.g., the vehicle is traveling straight or traveling in any way other than cornering), executed preferentially is the energy management control of controlling the driving of the motor generator 72 to cause the charged state (SOC) of the high-voltage battery 71, which supplies electric power to the motor generator 72, to fall within the predetermined range. Thus, by preferentially executing the energy management control when it is unnecessary to preferentially execute the front and rear driving force control, the charged state (SOC) of the high-voltage battery 71 is caused to fall within an appropriate range. It is therefore possible to use the electric power in a situation that requires preferentially executing the front and rear driving force control. It is thus possible to achieve (appropriately adjust) a balance between the front and rear driving force control and the energy management control.

As a result, according to the embodiment, it is possible to preferentially execute the front and rear driving force control without being restricted by the energy management control in a situation where it is desired to give priority to the front and rear driving force control.

It is to be noted that when switching is performed between the front and rear driving force control and the energy management control for a system-side reason while the vehicle is cornering, the vehicle behavior may be influenced thereby (i.e., the driver (the occupant) may be given a feeling of strangeness). Meanwhile, the SOC (the remaining amount) of the high-voltage battery 71, which varies slowly, is predictable. Therefore, it is possible to prevent giving the feeling of strangeness to the driver (occupant) by performing energy management selectively on a straight road or in any other situation.

Although embodiments of the invention have been described in the foregoing, the invention is not limited to the above-described embodiments and various modifications may be made. For example, the above-described configuration of the driving force transmission system (e.g., the arrangement of the gears and the shafts) are a mere example, and the above-described embodiment is non-limiting. In addition, although the electromagnetic clutch is used as the LSD clutch 42 in the above-described embodiment, a hydraulic clutch may be used. In addition, the configuration (type) of the center differential unit 40 is not limited to that of the above-described embodiment and may be of another type.

In addition, for example, the system configuration of the controllers, including the HEV-CU 60 and the ECU 80 and the function allocation between the controllers are not limited to those of the above-described embodiment. In the above-described embodiment, the HEV-CU 60, the ECU 80, the PCU 70, the VDCU 50, the drive assist device 90, and the car navigation system 91 are coupled to each other via the CAN 100 in a mutually communicable manner. However, the system configuration is not limited to such a configuration. For example, the system configuration may be freely changed taking into consideration functional requirements, cost, and any other factor.

In addition, although the stereo camera 90a is used in the above-described embodiment to detect the external environment (e.g., the corners), for example, a device such as a millimeter-wave radar, a laser radar, or an ultrasonic sensor may be used in place of the stereo camera. In addition, a plurality of different sensors may be used in combination.

DESCRIPTION OF REFERENCE NUMERALS

1 Control apparatus for all-wheel-drive hybrid electric vehicle
4 All-wheel-drive hybrid electric vehicle (AWD HEV)
10FL, 10FR, 10RL, 10RR Wheel
11FL, 11FR, 11RL, 11RR Brake
12FL, 12FR, 12RL, 12RR Wheel speed sensor
16 Steering angle sensor
20 Engine
22 Dry clutch
30 Manual transmission
40 Center differential unit
41 Planetary gear unit (Center differential)
41a Sun gear
41b Planetary pinion (Planetary carrier)
41c Ring gear (Internal gear)
42 LSD clutch (Differential limiting clutch)
43 Front drive shaft
46 Propeller shaft
50 VDCU
55 Longitudinal acceleration sensor
56 Lateral acceleration sensor
57 Yaw rate sensor
58 Brake switch
60 HEV-CU
61 Accelerator position sensor
62 Resolver
63 Raindrop sensor (Rain sensor)
70 PCU
72 Motor generator
80 ECU
81 Airflow meter
82 Throttle angle sensor
90 Drive assist device
91 Car navigation system
100 CAN

The invention claimed is:

1. A control apparatus for an all-wheel-drive hybrid electric vehicle, the control apparatus comprising:
an engine;
a center differential unit that includes a differential limiting clutch, the center differential unit being configured to distribute driving force supplied from the engine between a front wheel and a rear wheel and output the driving force thereto, the differential limiting clutch being configured to freely limit differential motion of the front wheel and differential motion of the rear wheel in accordance with engagement force;
a motor generator provided between the center differential unit and the rear wheel, and coupled to the rear wheel to allow torque to be transmitted between the rear wheel and the motor generator;
a sensor configured to detect a traveling state of the all-wheel-drive hybrid electric vehicle; and
a control unit configured to control driving of the engine and driving of the motor generator as well as the engagement force of the differential limiting clutch, wherein
the control unit determines whether or not the traveling state requires giving priority to a front and rear driving force control on a basis of the traveling state detected by the sensor,
in a case where the traveling state is determined to require giving priority to the front and rear driving force control, the control unit preferentially execute the front and rear driving force control of controlling the driving of the engine and the driving of the motor generator as well as the engagement force of the differential limiting clutch in accordance with friction force between the front and rear wheels and a road surface, and
in a case where the traveling state is determined not to require giving priority to the front and rear driving force control, the control unit preferentially execute an energy management control of controlling the driving of the motor generator to cause a charged state of a high-voltage battery to fall within a predetermined range, the high-voltage battery being configured to supply electric power to the motor generator.

2. The control apparatus for the all-wheel-drive hybrid electric vehicle according to claim 1, wherein the control unit determines that the traveling state requires giving priority to the front and rear driving force control in a case where the all-wheel-drive hybrid electric vehicle is turning a corner, and determines that the traveling state does not require giving priority to the front and rear driving force control in a case where the all-wheel-drive hybrid electric vehicle is traveling on a straight road.

3. The control apparatus for the all-wheel-drive hybrid electric vehicle according to claim 2, wherein
the sensor includes a steering angle sensor configured to detect a steering angle of a steering wheel, a lateral acceleration sensor configured to detect lateral acceleration of the all-wheel-drive hybrid electric vehicle, and/or a yaw rate sensor configured to detect a yaw rate of the all-wheel-drive hybrid electric vehicle, and
the control unit determines whether or not the all-wheel-drive hybrid electric vehicle is turning the corner on a basis of the steering angle, the lateral acceleration, and/or the yaw rate.

4. The control apparatus for the all-wheel-drive hybrid electric vehicle according to claim 3, wherein the control unit preferentially executes the front and rear driving force control upon an elapse of a predetermined time after the all-wheel-drive hybrid electric vehicle starts to turn the corner.

5. The control apparatus for the all-wheel-drive hybrid electric vehicle according to claim 4, wherein the control unit starts the front and rear driving force control without waiting for the predetermined time to elapse in a case where a change speed of the steering angle is a predetermined speed or higher, in a case where a radius of the corner is a predetermined value or less, or in a case where friction resistance of a traveling road surface is a predetermined value or less.

6. The control apparatus for the all-wheel-drive hybrid electric vehicle according to claim 2, further comprising
an external environment detection unit configured to detect an external environment of the all-wheel-drive hybrid electric vehicle, wherein
the external environment detection unit detects presence or absence of a corner in front of the all-wheel-drive hybrid electric vehicle, a distance to the corner, and a radius of the corner, and
the control unit predicts entering of the all-wheel-drive hybrid electric vehicle into the corner on a basis of the distance to the corner, and determines whether or not the front and rear driving force control is preferentially executable while the all-wheel-drive hybrid electric vehicle is turning the corner on a basis of the radius of the corner.

7. The control apparatus for the all-wheel-drive hybrid electric vehicle according to claim 2, wherein, upon executing the energy management control, the control unit controls the engagement force of the differential limiting clutch to cause a front-wheel and rear-wheel driving force distribution ratio to fall within a predetermined range.

8. The control apparatus for the all-wheel-drive hybrid electric vehicle according to claim 2, wherein, upon executing the energy management control, the control unit controls the driving of the motor generator to cause the engine to operate within an operation range in which combustion efficiency is higher than a predetermined value.

9. The control apparatus for the all-wheel-drive hybrid electric vehicle according to claim 2, wherein further comprising a car navigation system configured to acquire information regarding a route to a destination, wherein
the car navigation system acquires information regarding a ratio between corners and straight roads to appear on the route to the destination, and
the control unit executes the energy management control on the straight roads to cause the charged state of the high-voltage battery to fall within the predetermined range on a basis of the information regarding the ratio between the corners and the straight roads to appear and the charged state of the high-voltage battery.

10. The control apparatus for the all-wheel-drive hybrid electric vehicle according to claim 3, further comprising an external environment detection unit configured to detect an external environment of the all-wheel-drive hybrid electric vehicle, wherein
the external environment detection unit detects presence or absence of a corner in front of the all-wheel-drive hybrid electric vehicle, a distance to the corner, and a radius of the corner, and
the control unit predicts entering of the all-wheel-drive hybrid electric vehicle into the corner on a basis of the distance to the corner, and determines whether or not the front and rear driving force control is preferentially executable while the all-wheel-drive hybrid electric vehicle is turning the corner on a basis of the radius of the corner.

11. The control apparatus for the all-wheel-drive hybrid electric vehicle according to claim 4, further comprising an external environment detection unit configured to detect an external environment of the all-wheel-drive hybrid electric vehicle, wherein
the external environment detection unit detects presence or absence of a corner in front of the all-wheel-drive hybrid electric vehicle, a distance to the corner, and a radius of the corner, and
the control unit predicts entering of the all-wheel-drive hybrid electric vehicle into the corner on a basis of the distance to the corner, and determines whether or not the front and rear driving force control is preferentially executable while the all-wheel-drive hybrid electric vehicle is turning the corner on a basis of the radius of the corner.

12. The control apparatus for the all-wheel-drive hybrid electric vehicle according to claim 3, wherein, upon executing the energy management control, the control unit controls the engagement force of the differential limiting clutch to cause a front-wheel and rear-wheel driving force distribution ratio to fall within a predetermined range.

13. The control apparatus for the all-wheel-drive hybrid electric vehicle according to claim 4, wherein, upon executing the energy management control, the control unit controls the engagement force of the differential limiting clutch to cause a front-wheel and rear-wheel driving force distribution ratio to fall within a predetermined range.

14. The control apparatus for the all-wheel-drive hybrid electric vehicle according to claim 3, wherein, upon executing the energy management control, the control unit controls the driving of the motor generator to cause the engine to operate within an operation range in which combustion efficiency is higher than a predetermined value.

15. The control apparatus for the all-wheel-drive hybrid electric vehicle according to claim 4. wherein. upon executing the energy management control, the control unit controls the driving of the motor generator to cause the engine to operate within an operation range in which combustion efficiency is higher than a predetermined value.

16. The control apparatus for the all-wheel-drive hybrid electric vehicle according to claim 3, wherein further comprising a car navigation system configured to acquire information regarding a route to a destination, wherein
the car navigation system acquires information regarding a ratio between corners and straight roads to appear on the route to the destination, and
the control unit executes the energy management control on the straight roads to cause the charged state of the high-voltage battery to fall within the predetermined range on a basis of the information regarding the ratio between the corners and the straight roads to appear and the charged state of the high-voltage battery.

17. The control apparatus for the all-wheel-drive hybrid electric vehicle according to claim 4, wherein further comprising a car navigation system configured to acquire information regarding a route to a destination, wherein
the car navigation system acquires information regarding a ratio between corners and straight roads to appear on the route to the destination, and
the control unit executes the energy management control on the straight roads to cause the charged state of the high-voltage battery to fall within the predetermined range on a basis of the information regarding the ratio between the corners and the straight roads to appear and the charged state of the high-voltage battery.

18. A control apparatus for an all-wheel-drive hybrid electric vehicle, the control apparatus comprising:
an engine;
a center differential unit that includes a differential limiting clutch, the center differential unit being configured to distribute driving force supplied from the engine between a front wheel and a rear wheel and output the driving force thereto, the differential limiting clutch being configured to freely limit differential motion of the front wheel and differential motion of the rear wheel in accordance with engagement force;

a motor generator provided between the center differential unit and the rear wheel, and coupled to the rear wheel to allow torque to be transmitted between the rear wheel and the motor generator; and a processor and a memory having a program, when executed, causing the processor to be configured to:
  detect a traveling state of the all-wheel-drive hybrid electric vehicle,
  control driving of the engine and driving of the motor generator as well as the engagement force of the differential limiting clutch, wherein the processor is further configured to:
  determine whether or not the traveling state requires giving priority to a front and rear driving force control on a basis of the detected traveling state, in a case where the traveling state is determined to require giving priority to the front and rear driving force control, preferentially execute the front and rear driving force control of controlling the driving of the engine and the driving of the motor generator as well as the engagement force of the differential limiting clutch in accordance with friction force between the front and rear wheels and a road surface, and in a case where the traveling state is determined not to require giving priority to the front and rear driving force control, preferentially execute an energy management control of controlling the driving of the motor generator to cause a charged state of a high-voltage battery to fall within a predetermined range, the high-voltage battery being configured to supply electric power to the motor generator.

* * * * *